United States Patent [19]

Inukai et al.

[11] 4,286,758

[45] Sep. 1, 1981

[54] WEBBING RETRACTOR

[75] Inventors: Mitsuo Inukai; Hajime Kamiyama, both of Nagoya, Japan

[73] Assignee: Toyota Jidosha Kogyo Kabushiki Kaisha, Toyota, Japan

[21] Appl. No.: 116,495

[22] Filed: Jan. 29, 1980

[51] Int. Cl.³ .................. A62B 35/02; B65H 75/48
[52] U.S. Cl. ........................... 242/107; 242/107.4 R; 280/806; 297/480
[58] Field of Search ............... 242/107.4 R–107.4 E, 242/107; 280/803–808; 297/474–480

[56] References Cited

U.S. PATENT DOCUMENTS

| 3,531,061 | 9/1970 | Davies | 242/107.4 B |
| 3,970,266 | 7/1976 | Doin et al. | 242/107.4 R |
| 4,056,242 | 11/1977 | Herrmann | 242/107.4 R |

FOREIGN PATENT DOCUMENTS 2336951  4/1974  France .................. 242/107.4 R

Primary Examiner—John M. Jillons
Attorney, Agent, or Firm—Koda and Androlia

[57] ABSTRACT

A drum is arranged coaxially with a winding barrel for winding up a webbing for restraining an occupant, the winding barrel is provided therein with an internal gear ratchet wheel and the drum is provided at the outer periphery thereof with a pawl for meshing, respectively, and, in an emergency of a vehicle, the drum is rotated, whereby the pawl is meshed with the internal gear ratchet wheel by use of cam means so that the winding barrel can be forcedly rotated in the direction of winding up the webbing, to thereby closely attach the webbing to the occupant.

10 Claims, 4 Drawing Figures

FIG.1

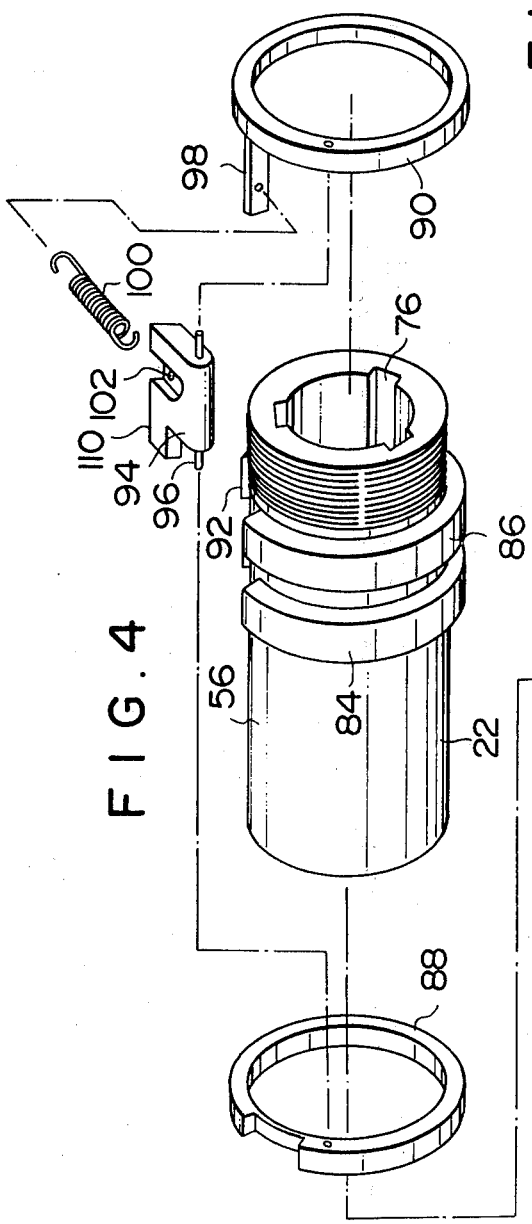

WEBBING RETRACTOR

BACKGROUND OF THE INVENTION

1. Field of the Invention

This invention relates to a webbing retractor for use in a seatbelt system for protecting an occupant in an emergency of a vehicle such as a collision, and particularly to a webbing retractor wherein the webbing is forceably retracted in an emergency of the vehicle to closely hold the occupant at a seat.

2. Description of the Prior Art

In general, webbing retractors are constructed such that one end of the webbing is adapted to be wound up into a winding barrel by a biasing force, the webbing is surroundingly attached to the occupant by said biasing force when the webbing is fastened to the occupant, and such a cosideration is paid that, after the webbing is unfastened, most part of the webbing is wound up into the winding barrel to be received therein so that the webbing does not lie about in the cabin. Furthermore, generally, the webbing retractor is provided therein with an inertia lock mechanism for preventing the webbing form being wound off only in an emergency of the vehicle, so that the occupant can freely move his body during normal running condition of the vehicle.

However, since the biasing force for winding up the webbing tends to give the occupant a feeling of being repressed, said biasing force cannot be further increased, and is set to the minimum level required for winding up the necessary length of the webbing after the webbing is unfastened from the occupant. For this reason, only a very weak biasing force for winding up the webbing is applied to the webbing surroundingly attached to the occupant, whereby considerable clearances are formed between the webbing and occupant and between the occupant and his seat. Consequently, even after the windoff of the webbing is stopped in an emergency of the vehicle, until said clearances are decreased and the webbing is closely attached to the occupant, the occupant is moved in a direction of collision of the vehicle under unsatisfactory restraint.

From this reason, heretofore, there has been proposed a webbing retractor provided therein with a so-called preload mechanism in which a sudden windup force is applied to the webbing in an emergency of the vehicle to secure the occupant to his seat. However, said preload mechanisms have presented drawbacks such as difficulties in clearly distinguishing it from the webbing windup mechanism during normal running of the vehicle, which contributes to cause a malfunction, troubles hindering normal operations of winding up and off the webbing, unsatisfactory instantaneous windup of the webbing in an emergency of the vehicle, and the like.

SUMMARY OF THE INVENTION

The invention has been developed in view of the disadvantages of the prior art described thereinabove and has as its object the provision of a webbing retractor wherein the preload mechanism and the ordinary webbing retractor can be clearly distinguished, whereby the preload mechanism is not affected by usual handling in the webbing windup and windoff operations, and, in an emergency of the vehicle, the webbing can be quickly wound up, whereby the webbing is closely attached to the occupant.

The webbing retractor according to the present invention is of such an arrangement that an internal gear ratchet wheel is provided in a webbing winding barrel, a drum to be rotated in an emergency of the vehicle is made coaxial with the winding barrel, a pawl provided on the outer periphery of the drum is meshed with said internal gear ratchet wheel of the winding barrel through the agency of a cam, whereby the drum and the winding barrel are quickly connected to each other, and the webbing is wound up by the winding barrel, so that the occupant can be secured to his seat.

Description will hereunder be given of an embodiment of the present invention with reference to the drawings.

BRIEF DESCRIPTION OF THE INVENTION

FIG. 1 is a sectional front view showing an embodiment of the webbing retractor according to the present invention;

FIG. 3 is a view in the direction indicated by the arrows from the line III in FIG. 1; and FIG. 4 is a disassembled perspective view showing the assembled state of the pawl.

DESCRIPTION OF THE PREFERRED EMBODIMENT

Figure 1:
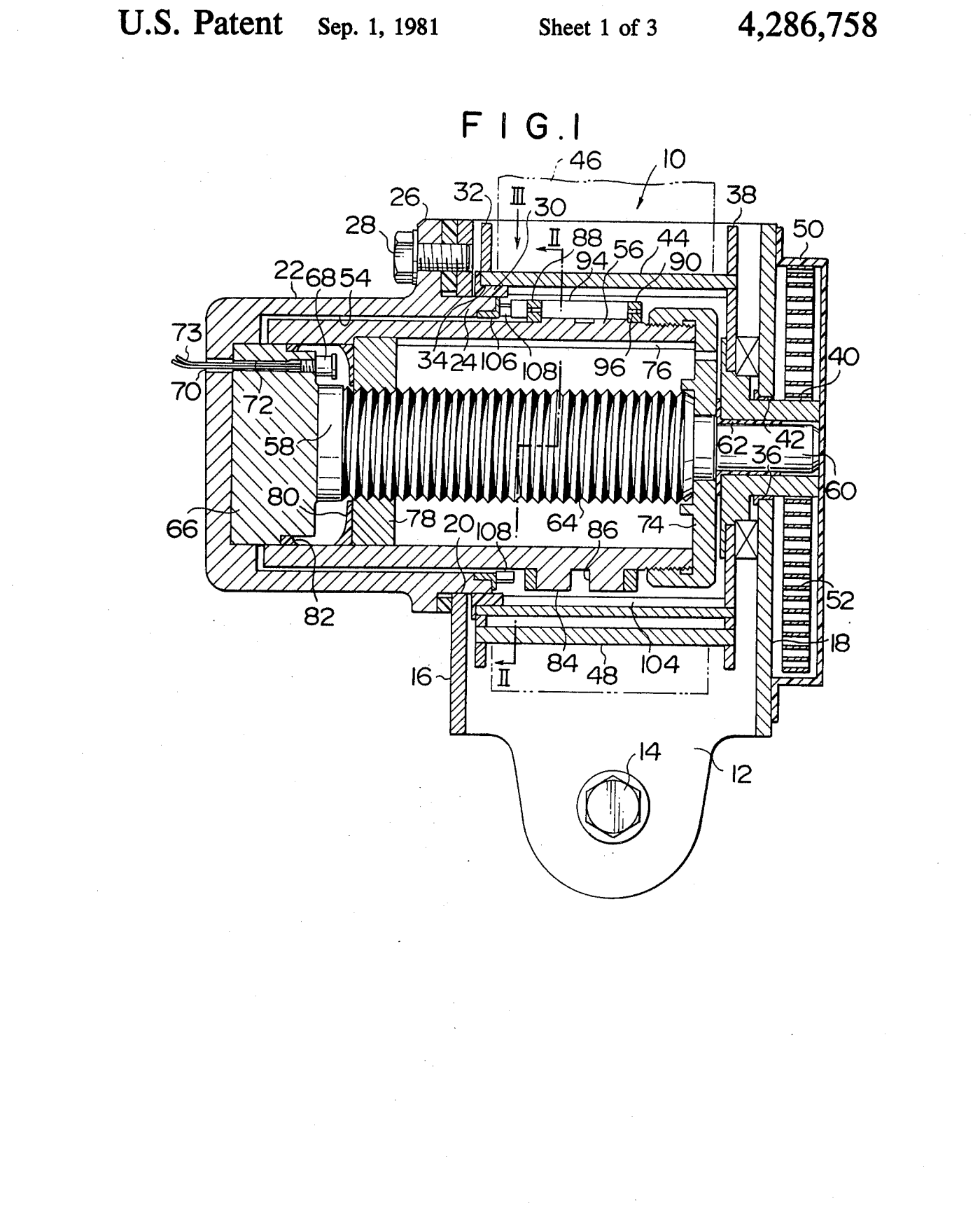
Figure 2:
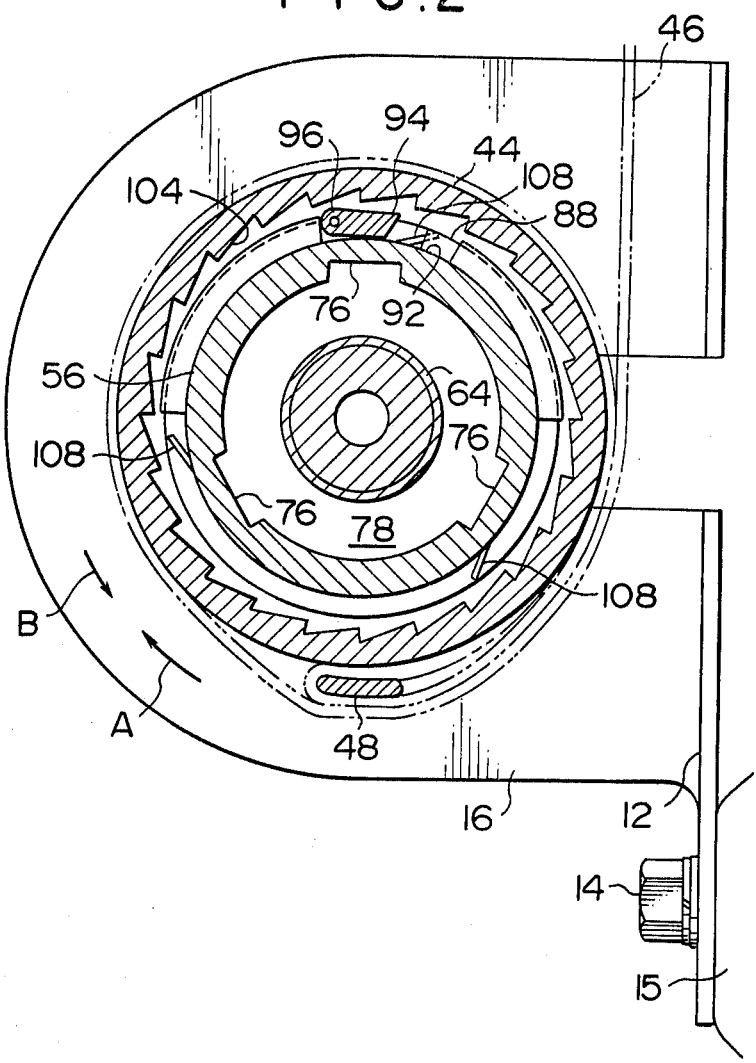
FIG. 2 is a sectional view taken along the line II—II in FIG. 1.

In FIGS. 1 and 2, a webbing retractor 10 according to the invention is adapted to be solidly secured to a suitable position of a vehicle 15 with a mounting bolt 14 being applied to a mounting hole penetrated in a plate-like frame 12. Two leg portions of said plate-like frame 12 are bent into legs 16, 18 extended in parallel to each other.

As shown in FIG. 1, said leg 16 is penetratingly provided therein with a cylindrical hole 20, through which a projecting cylindrical portion 24 of a cover 22 is inserted. Said cover 22 is clampedly secured to the leg 16 with a plurality of mounting bolts 28 being applied to a flange portion 26 radially extended from a base portion of said projecting cylindrical portion 24. A disk 32 is pivotally supported by the projecting cylindrical portion 24 of said cover 22 through a bearing hole 34 which is penetrated in the center of the disk 32 by way of a bush 30. On the other hand, a cylindrical shaft 40 solidly secured to the center of a disk 38 is pivotally supported through a bush 42 by a cylindrical hole 36 formed in a leg 18 coaxially with the cylindrical hole 20 of the leg 16. Said disks 32 and 38 are solidly secured to opposite ends of a cylindrical winding barrel 44. Said cylindrical winding barrel 44 and the disks 32, 38 constitute a takeup shaft for a webbing 46 for restraining an occupant, and said winding barrel 44 receives therein a preload mechanism.

As indicated by two-dot chain lines in FIG. 2, one end of the webbing 46 for restraining the occupant is wound up into the winding barrel 44, and thereafter, the end portion is wound around and engaged with an enging arm 48 solidly secured to the disks 32, 38. The other end, not shown, of the webbing 46 is secured thereto with a tongue plate, and said tongue plate is engaged with a buckle device secured to the car body at the side opposite to the webbing retractor through the seat for the occupant, so that the intermediate portion of the webbing can be fastened to the occupant.

Furthermore, a spring case 50 is mounted at the exterior of the leg 18. Confined between said spring case 50 and the cylindrical shaft 40 extending through the cylindrical hole 36 of the leg 18 is a spiral spring 52, which biases the winding barrel 44 in a direction of winding up the webbing (in a direction indicated by an arrow A in FIG. 2). Consequently, the occupant pulls the other end, not shown, of said webbing 46, rotating the winding barrel 44 against a biasing force of the spiral spring 52 in a direction of winding off the webbing, thus enabling to fasten the webbing to himself.

The central portion of said cover 22 is greatly bulged out in a direction of being separated from the leg 16 and is formed therein with a columnar hollow portion 54. Housed in said columnar hollow portion 54 and in the winding barrel 44 are a drum 56 and a drum support shaft 58.

One end of said drum support shaft 58 is formed into a reduced diameter portion 60 extending through a cylindrical hole 36 of the leg 18, and is pivotally supported on the cylindrical shaft 40 through a bush 62. Furthermore, threads 64 having a large pitch are formed on the intermediate portion of the drum support shaft 58, and the other end of the drum support shaft 58 is formed into an enlarged diameter portion 66 which is solidly secured to the bottom surface of the hollow portion 54 in the cover 22. A charge of powder 68 is secured to said enlarged diameter portion 66, and electrically connected to said charge of powder 68 through holes 70, 72 penetrated through the cover 22 and the drum support shaft 58 from outside is a wiring 73 for setting off the powder. The other end, not shown, of said wiring 73 is connected to a sensor for sensing an emergency of the vehicle, so that an electrical signal can be sent to the charge of powder 68 to set off it in an emergency of the vehicle such as a collision.

Said drum 56 is formed into a cylindrical shape, a closure member 74 is threadably coupled onto one end of said drum 56, and said closure member 74 is journalled at one end thereof on a portion adjacent the reduced diameter portion 60 of the drum support shaft 58. Said drum 56 is journalled at the other end thereof on the outer peripheral portion of the enlarged diameter portion 66 of the drum support shaft 58 solidly secured to the cover 22, so that said closure member 74 can be rotated coaxially with the drum 56.

Three grooves having square cross-section are formed on the inner peripheral surface of said drum 56 in the axial direction in parallel to one another, and engaged with said square grooves are external ridges of a piston 78 threadably coupled onto the threads 64 of the drum support shaft 58. Here, the piston 78 is disposed on one end of the threads 64, i.e., at the side closest to the enlarged diameter portion 66 during normal running of the vehicle as shown in FIG. 1, and, upon receiving a high gas pressure due to the explosion of the charge of powder 68, the piston 78 moves to the other side of the threads 64, i.e., toward the reduced diameter portion 60 while being spirally rotated. The threading direction of the threads 64 is determined such that, due to the axial movement and turning force of said piston 78, the drum 56 engaged with the outer periphery of said piston 78 is rotated in a direction of winding up the webbing as shown in FIG. 4. In this embodiment, the threads 64 are left-hand ones.

In addition, in order that the gas pressure due to the explosion of the powder 68 can be efficiently transmitted to the piston 78, a rubber seal 80 secured to the rear surface of the piston 78 is adapted to block the gaps between the piston 78 and the square grooves 76 and between the piston 78 and the threads 64, respectively, when the piston 78 moves axially of the drum support shaft 58. Furthermore, a rubber seal 82 similar to the aforesaid one is secured to a portion adjacent to the outer periphery of the enlarged diameter portion 66 of the drum support shaft 58 for preventing gas leakage between the enlarged diameter portion 66 and the drum 56.

As shown in FIG. 4, said drum 56 is provided at the axially intermediate portion thereof with a pair of flange portions 84, 86 projecting radially, and further, a pair of rings 88, 90 are coupled onto the outer periphery of the drum 56 for clampingly holding the flange portions 84, 86. Furthermore, the flange portions 84, 86 are partially formed with a cutout 92, into which a clutch pawl 94 is inserted, and said clutch pawl 94 is made rotatable by a pin 96 journalled at opposite ends on the rings 88, 90.

Furthermore, racked across the rings 88 and 90 is a spring support 98, with which one end of a tension coil spring 100 is engaged. The other end of said tension coil spring 100 is inserted into a spring engaging hole 102 formed at one portion of the pawl 94, and the forward end of the pawl 94 is biased in the radial direction of the drum 56 by a biasing force of said tension coil spring, to thereby be separated from the internal gear ratchet wheel 104 notchedly provided on the inner surface of the winding barrel 44. Said pawl 94 can be meshed with the internal gear ratchet wheel 104 when rotated about the pin 96 against the biasing force of the spring 100, and, when the drum 56 is rotated in a direction of winding up the webbing under the meshing condition as described above, the winding barrel 44 can be rotated together with the drum 56 in the direction of winding up the webbing.

A cam ring 106 is unrotatably coupled into one end of the hollow portion 54 at a portion closest to the ring 88 pivotally supporting said pawl 94, and three cams 108 project from said cam ring 106 in the axial direction and are opposed to an extension 110 of the pawl 94. Said cams 108 are each provided with a cam surface inclined at a certain angle so as to abut against the extension 110 of the pawl 94, when the drum 56 is rotated in a direction of winding up the webbing, and rotate the pawl 94 about the pin 96 against the biasing force of the tension coil spring 100.

In this embodiment, there are shown three cams 108 projected from the cam ring 106. However, when the assembling position of the pawl 94 is fixed, one cam 108 may be provided at a portion closest to the pawl 94.

Additionally, three pawls 94 corresponding to three cams 108, respectively, may be provided on the drum 56.

In this embodiment of-the invention with the arrangement as described above, the preload mechanism including the pawl 94, piston 78 and the like, all of which are housed in the drum 56, is separated from the internal gear ratchet wheel 104 of the winding barrel 44 during normal running of the vehicle, whereby the winding barrel 44 is free from the influence of said preload mechanics, so that the webbing can be wound off against the biasing force of the spiral spring 52 and fastened to the occupant, and even after the fastening, the webbing can be freely wound off or wound up against the biasing force of the spiral spring 52, thereby enabling to change the driving posture.

Next, in case the vehicle is in an emergency such as a collision, a sensor, not shown, senses the emergency of the vehicle and sends out a signal to the charge of powder 68 through the wiring 73, whereby the charge of powder is set off, so that the high pressure thus produced acts on the rear surface of the piston 78. By this, the piston 78 suddenly moves toward the leg 18, turning along the threads 64 of the drum support shaft 58. The turning force of said piston 78 is transmitted through the square grooves 76 to the drum 56 to cause it to be suddenly rotated in a direction of winding up the webbing. At first stage of this rotation, the pawl 94 comes into abutting contact with the cams 108 through the extension 110, whereby said pawl 94 is rotated about the pin 96 against the biasing force of the tension coil spring 100 to be meshed with the internal gear ratchet wheel 104. Consequently, the winding barrel 44 is connected through the pawl 94 to the drum 56, and is suddenly rotated in a direction of winding up the webbing, and winds up the webbing around the winding barrel 44. Consequently, the remaining portion of the webbing is wound up around the winding barrel 44, whereby the webbing is firmly attached to the occupant to reliably restrain him with the webbing, so that the occupant can be safely protected without moving in the direction of the collision of the vehicle.

In addition, during operation described above, when the pawl 94 is meshed with the internal gear ratchet wheel 104 and the winding barrel 44 starts rotating, the three cams 108 interfere with a rotating path of the extension 110, with the result that the cams 108 are broken off from the cam ring 106. However, said pawl 94, which has been positively meshed with the ratchet wheel 104, does not have any trouble.

In addition, in the abovedescribed webbing retractor, there may be provided an inertia lock mechanism in which ratchet wheels are notchingly provided on the outer peripheries of the disks 32, 38 solidly secured to the winding barrel 44, a pawl actuated by a pendulum or the like for sensing acceleration of the vehicle is engaged with said ratchet wheels, to thereby suddenly interrupt the wind off rotation of the winding barrel 44.

As has been described so far, the webbing retractor according to the present invention is constructed such that the rotation of the drum is transmitted through the pawl to the winding barrel, and said pawl is meshed with the winding barrel by use of cams only when the drum is rotated, and hence, can offer such excellent advantages that the preload mechanism is clearly distinguished from the ordinary webbing windup mechanism for driving the winding barrel by a spiral spring, so that possibilities of malfunctions are minimized, the ordinary webbing windup mechanism can smoothly operate in the same manner as the conventional webbing windup mechanism, and the winding barrel can be immediately connected to the drum in an emergency of the vehicle so that the webbing can be quickly wound up.

What is claimed is:

1. A webbing retractor for use in a seatbelt system for retaining and protecting an occupant in an emergency of a vehicle, comprising:
   (a) a winding barrel for winding up a webbing for restraining the occupant;
   (b) an internal gear ratchet wheel provided on said winding barrel;
   (c) a drum journalled coaxially with said winding barrel;
   (d) a pawl provided on the outer periphery of said drum;
   (e) cam means coupled to a frame and provided adjacent said pawl for moving said pawl in the radial direction of the winding barrel when said pawl is rotated with said drum and for causing said pawl to be meshed with said internal gear ratchet wheel; and
   (f) drive means for rotating said drum in the direction of winding up the webbing in an emergency of the vehicle;

whereby said drum is adapted to drive the winding barrel to forcedly wind up one end of the webbing around the winding barrel, to thereby closely attach the webbing to the occupant.

2. A webbing retractor as set forth in claim 1, wherein said cam means is fixed relative to said frame which rotatably supports said winding barrel.

3. A webbing retractor as set forth in claim 2, wherein said cam means is projected from a cam ring secured to said frame in the axial direction of said cam ring.

4. A webbing retractor as set forth in claim 1, wherein said cam means is engaged with an extension of the pawl so as to drive said pawl.

5. A webbing retractor as set forth in claim 3, wherein a plurality of said cams are provided on the circumference of said cam ring.

6. A webbing retractor as set forth in claim 1, wherein said pawl is disposed in the winding barrel.

7. A webbing retractor as set forth in claim 1, wherein said pawl is pivotally supported by a pin provided on the outer periphery of said drum.

8. A webbing retractor as set forth in claim 7, wherein said pin is secured to a pair of rings coupled onto the drum.

9. A webbing retractor as set forth in claim 8, wherein said pawl is separated from the internal gear ratchet wheel by a tension coil spring stretched between said pawl and a spring support racked across said pair of rings.

10. A webbing retractor for use in a seatbelt system for restraining and protecting an occupant in an emergency of a vehicle, comprising:
   (a) a frame, in which a pair of legs are extended in parallel to each other, said frame being solidly secured to the car body;
   (b) a hollow winding barrel journalled on said pair of legs for winding up one end of a webbing for restraining the occupant by a biasing force;
   (c) an internal gear ratchet wheel notchingly provided on the inner periphery of said winding barrel;
   (d) a drum journalled coaxially with said winding barrel;
   (e) a pawl journalled on the outer periphery of said drum and biased to be separated from said internal gear ratchet wheel;
   (f) cam means for being engaged with said pawl when said drum is rotated in an emergency of the vehicle to mesh said pawl with said internal gear ratchet wheel; and
   (g) drive means for rotating said drum in the direction of winding up the webbing in an emergency of the vehicle; whereby the winding barrel is forcedly rotated in the direction of winding up the webbing to firmly attach the webbing to the occupant.

* * * * *